United States Patent
Newman

(10) Patent No.: US 8,862,476 B2
(45) Date of Patent: Oct. 14, 2014

(54) VOICE-ACTIVATED SIGNAL GENERATOR

(71) Applicant: David Edward Newman, Temecula, CA (US)

(72) Inventor: David Edward Newman, Temecula, CA (US)

(73) Assignee: Zanavox, Temecula, CA (US)

( * ) Notice: Subject to any disclaimer, the term of this patent is extended or adjusted under 35 U.S.C. 154(b) by 158 days.

(21) Appl. No.: 13/678,951

(22) Filed: Nov. 16, 2012

(65) Prior Publication Data

US 2014/0142949 A1 May 22, 2014

(51) Int. Cl.
*G10L 21/00* (2013.01)
*G10L 21/18* (2013.01)

(52) U.S. Cl.
CPC ........................................ *G10L 21/18* (2013.01)
USPC ............................ 704/275; 704/231; 704/270

(58) Field of Classification Search
USPC .......................................... 704/231, 270, 275
See application file for complete search history.

(56) References Cited

U.S. PATENT DOCUMENTS

| | | | | |
|---|---|---|---|---|
| 4,178,472 | A * | 12/1979 | Funakubo et al. | 704/254 |
| 4,641,292 | A * | 2/1987 | Tunnell et al. | 367/198 |
| 5,247,705 | A * | 9/1993 | Attig et al. | 455/74 |
| 6,324,514 | B2 * | 11/2001 | Matulich et al. | 704/275 |
| 7,006,974 | B2 * | 2/2006 | Burchard et al. | 704/275 |
| 7,027,991 | B2 | 4/2006 | Alexander | |
| 7,039,590 | B2 * | 5/2006 | Luchaup | 704/275 |
| 7,080,014 | B2 * | 7/2006 | Bush et al. | 704/275 |
| 7,523,038 | B2 | 4/2009 | Ariav | |
| 8,036,884 | B2 * | 10/2011 | Lam et al. | 704/205 |
| 2002/0103651 | A1 * | 8/2002 | Alexander et al. | 704/275 |
| 2002/0178009 | A1 * | 11/2002 | Firman | 704/275 |
| 2003/0105637 | A1 * | 6/2003 | Rodriguez et al. | 704/270 |
| 2004/0181415 | A1 * | 9/2004 | Krol et al. | 704/275 |
| 2005/0036589 | A1 * | 2/2005 | Bossemeyer | 379/88.01 |
| 2005/0165609 | A1 * | 7/2005 | Zuberec et al. | 704/270 |
| 2005/0177363 | A1 * | 8/2005 | Oh | 704/208 |
| 2008/0162147 | A1 * | 7/2008 | Bauer | 704/275 |
| 2009/0098836 | A1 * | 4/2009 | Yurman et al. | 455/90.2 |
| 2010/0082351 | A1 * | 4/2010 | Lee | 704/275 |
| 2010/0198591 | A1 * | 8/2010 | Yoshizawa et al. | 704/231 |
| 2011/0282658 | A1 * | 11/2011 | Wang et al. | 704/208 |
| 2012/0265526 | A1 * | 10/2012 | Yeldener et al. | 704/233 |
| 2013/0144627 | A1 * | 6/2013 | Li | 704/270 |
| 2013/0185079 | A1 * | 7/2013 | Park et al. | 704/275 |
| 2014/0012573 | A1 * | 1/2014 | Hung et al. | 704/233 |

* cited by examiner

*Primary Examiner* — Douglas Godbold

(57) ABSTRACT

A voice-activated signal generator is a device to produce output signals responsive to spoken commands. The device accepts only predetermined commands and responsively generates specific output signals such as a pulse, a series of pulses, a voltage level, or a periodic waveform. The device is suitable for triggering an oscilloscope, or controlling a circuit under test, or activating another instrument. The invention also enables safely controlling a hazardous system such as a high voltage system, hands-free and with precise timing determined by the user. Also disclosed are fast, compact, robust algorithms for analyzing spoken commands, and particularly for detecting voiced and unvoiced sound, and for identifying commands by comparing the order of sound intervals in the spoken command to templates that represent the predetermined commands. The device may have one output or multiple outputs in parallel, all controlled by voice commands with precision output timing.

19 Claims, 5 Drawing Sheets

VOICE-ACTIVATED SIGNAL GENERATOR

FIELD OF THE INVENTION

The invention pertains to voice-activated systems, and more particularly to devices for generating electronic signals responsive to a spoken command.

BACKGROUND OF THE INVENTION

Speech interpretation is a technically hard problem. After decades of development, the goal of direct voice control over electronic devices remains expensive and frustrating. The ability to activate a device by a spoken command would lead to an enormous range of valuable products. Unfortunately, most of the development effort to date has been dedicated to the interpretation of free-form natural speech, primarily for computer dictation, browsing, and general query service, although it inevitably requires powerful computers and expensive software, and often a costly wireless data link to a remote supercomputer as well. Most of the emerging voice-activation applications, on the other hand, are special-purpose devices involving just a few specific operations and just a few predetermined commands. For such applications, general speech interpretation is vastly excessive. Even with a dedicated array of supercomputers, responsiveness is far too slow and far to erratic for special-purpose devices. Prior art is particularly inadequate for those applications where an instantaneous response is needed, such as timers or triggered data acquisition systems. Furthermore, the cost of speech interpretation often dominates the manufacturing cost of small dedicated devices, which often kills the entire voice-activated product on economic grounds alone.

Examples of potential applications that are poorly served by prior-art speech interpretation are voice-activated counters, sample-and-hold voltmeters, and triggerable products derivative therefrom, as well as voice-activated distance measuring devices such as tape measures and calipers. Further examples include devices that perform a specific action other than making a measurement, such as a voice-activated solder feeder or a welding-rod advancer for when both hands are occupied, a voice-controlled industrial weighing or labeling station for efficient package handling, and voice-controlled machine shop accessories including parts counters and machine controllers. In the home, there is a need for voice-controlled faucets, preferably including both flow and temperature control to assist the disabled, a voice-activated toilet flush device also for the physically impaired, voice-activated soap dispenser and towel dispenser for improved sanitation, and a host of voice-activated kitchen gadgets, numerous voice-activated devices for athletic/sports/health activities, not to mention an infinite variety of fun and educational toys. Each of these example products does not need, and would not benefit from, a general speech interpretation capability—even if it were free.

There is also a continuing demand for new ultra-safe devices for working in a hazardous environment such as around high voltage. Workers often need to control measurement instruments or other devices in the presence of toxic chemicals, pathogens, explosives, radiation, extreme heat or cold, moving blades, presses, and many other hazards. Today, workers must activate a system or adjust a parameter using long insulating poles, an awkward and imprecise solution at best. Means are needed to do these tasks by voice commands alone, thereby enabling precise control over the action and timing of a hazardous operation, but from a safe distance.

To focus on just one potential application, there is an acute need for a signal generating device that enables users such as electronic testing engineers to control the timing of a measurement or to prompt a system under test. Everyone who uses oscilloscopes is quite familiar with the problem of triggering the scope while both hands are occupied. The user must hold two probes in place while adjusting a potentiometer or while doing something extremely critical with the circuit under test. But with both hands occupied, there is simply no way to trigger the scope when needed.

Recently an oscilloscope has become available with voice-activated features. See for example U.S. Pat. No. 7,027,991 to Alexander. This is a big step in the right direction. However the voice control is restricted to just one instrument, is not detachable, is not self-contained, and produces no output signals. A versatile device would produce a variety of output signals which would be usable on a wide range of receiving systems.

A clever command recognition method was introduced in U.S. Pat. No. 7,532,038 to Ariav, wherein electronic filters separate the command sounds into high and low frequency components. A few commands can be identified on the basis of frequency alone, but the system requires cumbersome analog electronics with dual amplification and dual or multiplexed ADC inputs. Also it ignores crucial non-sinusoidal waveform information in the sound, and is unable to differentiate among commands with silent intervals, and is unable to discriminate brief versus sustained sounds, among other limitations.

What is needed is a voice-activated device to control a measurement instrument or any electronic system, by voice command alone. Preferably such a device would be fast and extremely economical, while providing specific output signals on command. Preferably the new device would avoid completely the monumental expense and frustration of speech interpretation systems that require full-performance computers, massive software, and tedious "training". The new device would simply produce the signal on command. Such a device would enable applications in electronic testing, industrial control, and a host of consumer items that require low-cost voice activation.

BRIEF SUMMARY OF THE INVENTION

The invention is a device to produce an output signal in response to a spoken command that matches a predetermined command. The device includes a microphone to detect sounds of the spoken command, and a processor to compare the spoken command with one or more predetermined commands, and an output connector to detachably connect with a receiving system. When the spoken command matches one of the predetermined commands, the device responsively generates a particular output signal that depends on which of the predetermined commands is matched, and passes the output signal through the output connector to the receiving system.

The inventive spoken and predetermined commands comprise any utterance by any person (the "user") for the purpose of generating the output signal or controlling the receiving system. The spoken command may be any word or phrase in any language, or even nonsense, so long as it includes sufficient sound to be detected and analyzed. Usually the spoken command is analyzed by detecting sounds of the spoken command, and then quantitatively determining certain features of the sounds such as the amplitudes and frequencies of the sounds, as well as the order in which those sounds or features occur in the command. Usually the predetermined commands are represented by data indicating the features of each predetermined command. The spoken command and a predetermined command are equivalent, or they "match", when their corresponding features are equal. The inventive output signal is any electrical transmission such as a pulse or pulse train, a voltage or a change in voltage, a periodic waveform or a modulation of a waveform. The inventive receiving system is any electronic equipment that is able to receive the output signal and to be controlled by the output signal.

The objective of the invention is to enable a user to control the receiving system, thereby causing the receiving system to perform certain specific actions, simply by speaking one or more of the predetermined commands. The invention is not intended to perform free-form speech interpretation; rather, the invention recognizes a few distinct commands for which it has been programmed, and responsively generates specific output signals associated with those commands. An important aspect of the invention is that it can control an unlimited number of different receiving systems since the invention is portable and detachable and self-contained, and thus is not restricted to a single receiving system. One application of the invention is to enable an electronic test engineer to trigger a measurement instrument while both hands are busy holding probes or adjusting circuit elements. Another application is to activate or modulate a circuit under test, so as to reveal a problem or demonstrate the circuit's performance. A third application is to adjust a hazardous system such as a high voltage system from a safe distance. Those with experience in the electronic arts will find numerous further applications of the invention.

The inventive device comprises a microphone, a processor, and an output connector. The invention may also include an amplifier, a digitizer, and a power source. The microphone, amplifier, digitizer, processor, output connector, and power source may be held together by an enclosure, which may comprise a plastic or metal box, for example. When implemented as described herein, the device is detachable and portable and self-contained, thereby enabling easy reconnection with different receiving systems and quick setup for different applications. The invention is envisioned as a general bench tool, versatile and easily accessible with zero training required, potentially as useful as the common hand-held multimeters and calculators for example.

The inventive microphone is any transducer that converts sounds of the spoken command to an electrical signal, such as an electret or piezoelectric or magnetic microphone, which may be omnidirectional or unidirectional or noise-cancelling for example. Usually the microphone is positioned to sense the command sounds with little or no intervening material that could absorb some of the sound. Accordingly, the microphone could be mounted on the exterior of the enclosure or in a hole penetrating the enclosure, or the microphone could be mounted inside the enclosure but proximate to some holes or other penetrations that admit the sound.

The invention usually includes an amplifier to amplify, and optionally filter, the electrical signal from the microphone to produce an amplified signal. The amplifier comprises an operational amplifier or an audio amplifier or a transistor for example, and includes resistors and capacitors connected and configured to set the gain and bandwidth. Usually the amplifier amplifies signals only within a frequency passband which preferably includes all speech sounds, or at least sufficient sounds to identify the spoken command as one of the predetermined commands, and normally excludes DC and ultrasonic frequencies. The gain may be flat across the passband, or the amplifier may be configured for higher gain at high frequencies and lower gain at low frequencies, to compensate differences in speech sounds. The amplifier may have fixed gain or variable gain, which may be controlled by a manual adjustment, or by voice commands, or automatically so as to keep the amplified signal within a certain amplitude range. The amplifier may comprise a separate assembly, or it may be integrated with the processor such as a microcontroller with an opamp built-in.

The invention usually includes a digitizer, comprising means for converting the amplified signal to a digitized signal by repeatedly measuring the voltage of the amplified signal. The digitizer thus produces a multitude of digital measurement values that comprise the digitized signal. The digitizer is usually an interface circuit such as an ADC (analog-to-digital converter) or a DSP (digital signal processor) or a set of voltage comparators, and is capable of performing the voltage measurement periodically and rapidly. Preferably the digitizer is configured to have a digitization period, or the average time between the voltage measurements, which will provide sufficient time resolution to enable analysis of the command sounds. Preferably the digitization period is in the range of 0.02 to 0.2 millisecond, and more preferably in the range 0.05 to 0.1 millisecond. If the digitizer operates faster than that latter range, sequential measurement values may be combined so as to obtain digital values having the preferred periodicity. If the digitizer operates more slowly, the ability to recognize certain speech sounds will be compromised. In some embodiments, the digitizer is included with the processor, such as a microcontroller with a built-in ADC.

The inventive processor is any calculating means for analyzing a signal representing sounds of the spoken command, that signal being either the electrical signal from the microphone, or the amplified signal from the amplifier, or the digitized signal from the digitizer. The processor may be a microcontroller or a general purpose CPU (central processing unit) or a digital signal analyzer or a custom ASIC (application specific integrated circuit) or an FPGA (field programmable gate array) or an assembly of discrete logic or transistors. Usually the processor is programmable. Configuring the processor to perform the analysis may comprise programming the processor with firmware or software instructions, or setting values and instructions permanently during manufacture. The processor is configured or programmed to analyze the sounds of the spoken command, and to quantitatively evaluate specific features such as sound amplitudes, frequencies, sound durations, and voltage variations in those sounds. The processor may be configured to measure time intervals that contain primarily one type of sound or sound feature, and may determine the order in which the sounds or sound features occur in the spoken command. The processor may compare the spoken command with the predetermined commands by comparing the sounds and features detected in the spoken command with the sounds and features of the predetermined commands. The spoken command and the predetermined command match when their corresponding sounds or features are equal. The device then generates an output signal responsive to such a match. Usually the device is able to generate a variety of output signals, and generates a particular output signal that depends on which of the predetermined commands matches the spoken command.

The inventive output connector is any means for detachably connecting the inventive device to the receiving system, and for conveying the output signal from the device to the receiving system. The output connector may be directly in contact with the receiving system, or may connect with the receiving system using cables or wires or other conductors. Usually the output connector comprises two conductors such as a BNC or SMA connector, or multiple conductors such as an audio phone jack or an Ethernet jack. The output connector could comprise a single conductor such as a banana socket or a binding post, in which case another conductor preferably establishes a common ground, or other voltage basis, between the inventive device and the receiving system.

The invention usually includes a power source comprising any source of DC electrical power sufficient to energize the amplifier and processor. The power source also energizes the microphone and the other components as needed. The power source comprises for example a disposable or rechargeable battery, a capacitor with sufficient storage capacity, or a photovoltaic array. When the power source is a rechargeable type, it may be recharged by an internal or external AC-to-DC converter such as a power supply, which may be connected to an external source of AC power during recharging.

The inventive device may include an output stage that adjusts the impedance or amplitude of the output signal, to properly drive the receiving system. For example the receiving system may be able to tolerate only a low voltage input, in which case the processor attenuates its output voltage accordingly before passing the output signal to the output connector. The properties of the output stage depend on the needs of the receiving system. The inventive device may include switch means allowing the user to select the type of output signal to be generated, such as a pulse or series of pulses, a voltage level, or a waveform for example.

The invention may include memory elements that contain information about the predetermined commands, thereby enabling an exact comparison with the spoken command. The information could indicate a series of amplitudes or frequency ranges or sound durations, or the order of same, or any other features of the predetermined commands that can be stored digitally. The information is preferably arranged in the form of templates or groups of data, each template comprising information about one of the predetermined commands, thereby facilitating the comparison with the spoken command. Each predetermined command is also associated with a particular output signal. When the spoken command matches one of the predetermined commands as represented by the templates, the device then generates the particular output signal that is associated with the matched template or with the matched predetermined command. The inventive memory elements comprise any means for storing digital information, and particularly for storing the templates. The memory elements may be microcontroller registers or CPU cache or external RAM (SRAM, DRAM, and their variations) or programmable memory (PROM, EPROM, EEPROM, and FLASH and their variations) for example. The inventive templates may comprise the information describing the predetermined commands, or the templates may comprise the memory elements themselves when the memory elements contain such information.

The invention may analyze the spoken command by detecting voiced and unvoiced sounds comprising the spoken command. A voiced sound is any sound produced by vocal cord resonance, while an unvoiced sound is produced by breath air passing through a restriction in the vocal tract but without vocal cord involvement. For example, voiced sound is produced by all of the vowels A, E, I, O, U and by the voiced consonants such as J, M, L, V, and R. Unvoiced sound is produced by the unvoiced consonants such as S, H, X, and the digraphs SH and CH. Each example-letter listed herein represents the sound produced when the letter is used in speech, as commonly pronounced in English. Every sound of a spoken command is either voiced or unvoiced, depending on whether the vocal cords participate. A voiced interval is an interval of time containing primarily voiced sound, and an unvoiced interval contains primarily unvoiced sound. Each command has a particular order of voiced and unvoiced intervals. Hence the invention may identify spoken commands by comparing the order of voiced and unvoiced intervals detected in the spoken command with the order of voiced and unvoiced intervals in the predetermined commands.

The invention may further discriminate sounds based on duration, for example the sounds being brief or sustained sounds. A brief sound is generated only transiently while an air obstruction in the vocal tract is opening or closing. Brief sounds may be voiced or unvoiced depending on whether the vocal cords produce sound during the transition. For example the brief-voiced consonants include B, D, and G, whereas the brief-unvoiced consonants include T, K, and P. A sustained sound may be continued as long as desired, but a brief sound cannot. Normally a brief sound has a duration less than a limit Tbrief, and a sustained sound has a duration longer than Tbrief, with Tbrief being typically about 20 to 60 milliseconds. All of the letter-examples mentioned in the previous paragraph are sustained, whereas all the letter-examples in this paragraph are brief. The invention may use the brief or sustained character of each sound interval to assist command identification. However, in practice the brief sounds are quite variable. Therefore the invention may ignore all the brief sounds, or may identify each command on the basis of the sustained sounds with or without the brief sounds being detectable.

The invention may identify a spoken command by detecting the sounds of the spoken command, analyzing the sounds to determine their voiced or unvoiced type, thereby determining the order of voiced and unvoiced intervals in the spoken command (the "detected order"), and then comparing the detected order to templates that indicate the order of voiced and unvoiced intervals in the predetermined commands. When the detected order matches one of the templates, the spoken command is equivalent to, or matches, the corresponding predetermined command, and the spoken command is thus identified. Preferably all the predetermined commands have a distinct order of voiced and unvoiced intervals, so that the identification may be unambiguous. When the brief-or-sustained character of the sound intervals is also determined, that information may also be included in the detected order and in the templates.

Many commands include silent intervals. A silent interval may be any time interval that is not a voiced or unvoiced interval; or alternatively, a silent interval may be any interval containing no detectable sound. The two versions give similar results in practice, although the latter is more sensitive to backgrounds. The inventive device may detect the silent intervals and include them in discriminating commands, in which case the spoken command matches a predetermined command when the order of voiced, unvoiced, and silent intervals in the spoken command is the same as the order of voiced, unvoiced, and silent intervals in one of the predetermined commands. A silent interval may be brief or sustained depending on its duration. Commands are normally preceded and followed by intervals of silence that indicate when the command starts and ends. The pre- and post-command silences are longer than any internal silence so that the beginning and ending of the command may be reliably discerned. However, the pre- and post-command silences are not included in the templates because they are always present, and thus provide no additional discriminating information.

To illustrate command identification by sound-interval analysis, the command "RESET" comprises four intervals: first a voiced interval during the RE portion of the command, then an unvoiced S, then a voiced interval for the second E, and then an unvoiced T sound. All of these intervals are sustained except the T which is brief. Although two different phonemes comprise the RE portion, in analysis the RE portion is detected as a single voiced interval because both letters generate voiced sound with no gap or pause between them. The invention detects the two-letter RE portion as a single interval of uninterrupted voiced sound. The command "RESET" can be summarized by the following abbreviation: (voiced)(unvoiced)(voiced)(unvoiced-brief), which corresponds to (RE)(S)(E)(T).

As a second example, the command "GO SLOW" comprises "GO" which has a single voiced interval, then a gap of silence, then the S which is unvoiced, and then the final portion "LOW" which is voiced. All of the intervals are sustained. The order of intervals is thus represented as: (voiced)(silence)(unvoiced)(voiced) corresponding to (GO)(-)(S)(LOW).

As a third example, the command "SET FAST" comprises intervals for "SET"=(unvoiced)(voiced)(unvoiced-brief), then a silent gap, and then "FAST"=(unvoiced)(voiced)(unvoiced). The ST portion appears as a single unvoiced sustained interval, despite the T being brief, because both the S and T produce unvoiced sound. When two adjacent intervals have the same type, with no intervening silence, generally they merge to form a single interval. Hence the ST portion appears as a single unvoiced sustained interval. Putting this together, the sound-interval code for "SET FAST" is thus (unvoiced)(voiced)(unvoiced-brief)(silence)(unvoiced)(voiced)(unvoiced).

The invention includes means for analyzing sounds to detect voiced and unvoiced sound intervals. Unvoiced sounds exhibit very rapid voltage variations corresponding to eddy turbulence generated by air passing through a constriction in the vocal tract, while voiced sounds have much slower voltage variations corresponding to the physical motion of the vocal cords. Unvoiced sounds generally have higher frequencies and voiced sounds generally have lower frequencies. Sound in a low range, up to about 1 kHz, corresponds roughly to voiced sound, and sound in a higher range, above about 3 kHz, correlates roughly to unvoiced sound. Hence the invention could detect the voiced and unvoiced sounds by analog-filtering the signal, or by transforming the digitized signal with an FFT program. Voiced sounds are detected when the lower frequency sound exceeds a threshold, and unvoiced sounds are detected when the higher-frequency sounds exceed a threshold. Such frequency-domain analyses are able to discriminate certain tailored commands, but they necessarily lose critical identifying information in the non-sinusoidal wave shapes of the raw signal, and they require extra analog electronics or extra frequency transformation steps.

Much more preferably, the invention discriminates voiced and unvoiced sounds by analysis of the digitized signal directly in the time domain and in real time. The slowly-varying voiced sounds are detected by adding or averaging sequential digitized signal values across an integration time of preferably about 0.5 to 2 milliseconds, thereby generating an integrated signal. The integration time is sufficient to extinguish the rapid variations of unvoiced sound, but passes the slower variations of voiced sound. To detect unvoiced sounds with much faster sound wave variations, sequential digitized signal values are subtracted from each other to obtain a differentiated signal. For optimal time resolution, the digitized values in the differential should be separated by about 0.05 to 0.1 milliseconds. The difference between sequential measurements having a periodicity in this range will strongly suppress the slow variations of voiced sound while emphasizing the fast variations of unvoiced sound.

The integrated and differentiated signals may then be smoothed to eliminate pulsatile noise and enhance reliability. For example the integrated and differentiated signals may be smoothed by subtracting a voltage corresponding to silence, taking the magnitude of the result, and then averaging the magnitude values across a sufficient period, usually about 5 to 20 milliseconds, to obtain a smoothed signal. Voiced sounds are detected by comparing the integrated signal (after smoothing, if included) to a voiced-sound threshold. Unvoiced sounds are detected by comparing the differentiated signal to an unvoiced-sound threshold. The inventive time-domain analysis provides rapid and reliable discrimination of voiced and unvoiced sounds, while avoiding cumbersome analog electronics other than a simple broadband gain stage, and also avoiding calculation-intensive and memory-intensive analysis such as FFT. By contrast, the inventive time-domain analysis can be performed with a simple microcontroller using a few lines of code.

The invention may recognize silent intervals among the sounded intervals, and use this information to enhance command recognition. In that case the detected order is the order of voiced and unvoiced and silent intervals in the spoken command, and the templates indicate the order of voiced and unvoiced and silent intervals in each of the predetermined commands. The spoken command then matches one of the predetermined commands when the detected order is identical to one of the templates, which implies that the order of voiced and unvoiced and silent intervals in the spoken command is the same as the order of voiced and unvoiced and silent intervals in the predetermined command corresponding to the matched template.

The templates may employ any code or representation that facilitates comparing the detected order with the templates. For example a template may comprise numbers in successive memory elements, each memory element corresponding to one of the intervals in the command, and each number indicating what type of sound is in that interval. The first memory element, representing the first interval, may have a 1 for a voiced interval, 2 for unvoiced, or 3 for a silent interval, and likewise for each successive memory element corresponding to each successive interval in the command. As a second example, the template may employ the bits in a pair of 8-bit registers, one register for voiced intervals and one for unvoiced intervals. Each bit corresponds to one interval, up to 8 intervals total. The first bit in the voiced register is set to 1 if the first interval is voiced, and 0 otherwise. The first bit in the unvoiced register is set to 1 if the first interval is unvoiced, and likewise for all intervals in the command. A silent interval would have a 0 in at the same bit location in both registers. Preferably the detected order uses the same representation for the spoken command. Using either the bit representation or the number representation, or any other representation, the templates are compared to the detected order by subtracting them, and a zero result indicates a match. Or, the detected order may be compared to the templates using the exclusive-or function, with the same effect.

Typically the invention can generate a plurality of different types of output signals, and the spoken command determines which of the output signal types is actually produced. For example the output signal may be a pulse generated responsive to a first command, or a series of pulses which would be started or stopped on a second command; or the output signal may be a voltage or other continuous signal, which is then modulated or otherwise altered in a particular way responsive to a third command; or the output signal may be a waveform comprising repeated shapes such as a square wave or a sawtooth wave or a sine wave or other shapes, which are altered in form or frequency, responsive to a fourth command. Thus the user obtains the particular output signal specified by the spoken command.

The invention may include a default output signal to be generated if the spoken command fails to match any of the predetermined commands. The default output signal may comprise an indication or alarm that a bad command was received, or it may comprise grounding the output signal, or it may be to do nothing. When a non-matching command is received while the device is already generating a continuous or repetitive output signal, such as a voltage level or a continuing waveform, the non-matching command normally has no effect on the output signal, and the output signal simply continues unchanged. Alternatively, a bad command may cause the output signal to be terminated, or some other consequence depending on the application needs.

The invention may include an enablement parameter that can be set to an enabled state or a disabled state, and an enabling command, and one or more output commands. When the enablement parameter is set to enabled, the device responds to the output commands as usual. When the parameter is disabled, the device inhibits all output signals and rejects all commands except the enabling command. The user first calls the enabling command, which sets the parameter to enabled, and then calls an output command, which generates the desired output signal. While the enablement parameter is set to enabled, the device recognizes and responds to the subsequent output commands. The advantage of the enablement parameter is that it helps reduce false triggering from background noises, and allows the user to inhibit output signals when necessary.

The inventive device may be configured to generate two different output signals according to the state of the enablement parameter. Responsive to the output command, the device generates a first output signal if the enablement parameter is set enabled, and the device generates a second output signal different from the first output signal if the enablement parameter is set disabled. The second output signal may comprise alerting the user that the enablement parameter is in the disabled state, or issuing a default output signal, or terminating any pre-existing output signal, or continuing to wait for the enabling command, or doing nothing. In addition, the invention could have a number of different enabling commands, each of which enables a different cluster of output commands. For example the command "ENGLISH" could enable a set of commands in the English language, and the command "FRANCAIS" could enable a set of commands in French.

The invention also includes means for setting the enablement parameter back to disabled. There are many ways to do this depending on the application needs. For example the same enabling command could set the parameter to the enabled and disabled states in alternation; hence the parameter is inverted each time the command is called. Or, there could be a separate disabling command that sets the enablement parameter to disabled. Or, the enablement parameter may be automatically set to disabled after each successful output command, thereby ensuring that only one output command may be executed at a time. Or, the enablement parameter may be automatically set to disabled upon a non-matching command, thereby avoiding false counts when background sounds are too high.

As a further alternative, the enablement parameter may be set to disabled when a particular time interval expires. Typically the enabling interval is about one second to a few seconds in duration. The device may start a timer when the enabling command occurs, and then the device would set the enablement parameter to disabled when the time interval expires. The disabling timer may be retriggered (restarted with the full duration) upon each successful output command, thereby allowing the user to call a series of commands without having to repeat the enabling command each time. The enabling time interval would then expire after the user stops calling commands. The user can again set the enablement parameter to enabled, by again calling the enabling command at any time. The enablement parameter provides the user with a great deal of flexibility and control over the operation while greatly improving noise rejection.

The invention normally generates the output signal after a post-command silent period has expired. The resulting output signal thus occurs shortly after the command is finished, which is soon enough for many applications. But for other applications, such as event timing or instantaneous data acquisition, the user needs a pulse instantly. Therefore the invention includes means for generating an output signal immediately upon detecting the first sound of a command, thereby providing an extremely prompt signal with precise timing.

To provide such an immediate pulse, the invention may include an immediate command which elicits an immediate output signal immediately upon detecting the first sound of the command. For example, the immediate command may start with a particular type of sound, different from the leading sound in all the other commands. More specifically, the immediate command may start with an unvoiced sound and all the other predetermined commands start with a voiced sound (or vice-versa). The processor generates an immediate output pulse as soon as the unvoiced sound is detected as the first sound in a command. The device generates the immediate output without waiting for the full command to be finished, but rather generates the immediate output upon the very first leading edge of the first sound of the command. This works best if the invention is able to discriminate voiced and unvoiced sounds quickly, preferably by deterministic wave analysis in the time domain, as described hereinabove.

An alternative way to provide an immediate output signal is to arrange an arming command that prepares or arms the device when called. After being armed, the device generates the output signal instantly upon detecting any subsequent sound of either type. Thus the user calls the arming command first, and then makes any sound at the moment the output signal is desired. As a further option, the device could instantly recognize the sound type following the arming command, and generate the immediate output signal only if the sound is of a particular type. The inventive device may be configured to terminate the arming condition as soon as the immediate output is generated, thus ensuring that only one immediate output is generated at a time. Or, the arming command may remain in effect, and all subsequent sounds would generate an immediate output signal, until a disarming command is received to turn the arming condition off.

The inventive system may include controls and switches such as a power on-off switch, a gain adjustment knob, and switches to control an operational mode. A mode switch may select among several types of output such as a pulse, a repetitive waveform, a DC level, a ramp, or an analog output, depending on what type of signal the receiving system requires. The device may include a manual control such as a button that when activated causes one of the output signals to be generated regardless of any spoken commands. Such a manual trigger option would be useful in some applications, for example to obtain the output signal in complete silence.

The inventive device may include visible indicators such as LED's (light-emitting diodes) that indicate a condition of the device. The indicator may indicate that the system is on, or that it is ready to receive a command, or that it is generating an output signal, or that the battery is running low for example. The indicator may also produce a visible indication whenever an output signal is generated, or whenever a bad command or noise is detected. If the output signal is an analog voltage, indicators could indicate that the output voltage is positive or negative or zero or some other voltage of interest. The inventive system may include an LCD (liquid crystal display) or other display to indicate an output voltage or an operational state, for example. The inventive system may include a detachable external microphone, which may be a clip-on or bench type microphone, and may include a wireless link. The inventive system may include a detachable speaker, such as a headset, which may alert the user with a sonic tone when each output signal is generated, or when a bad command is received for example.

The invention may include multiple output connectors, all carrying different output signals simultaneously, and all controllable by voice commands. Each output connector may have an associated mode switch that governs which type of output signals (pulse, waveform, analog voltage, etc.) are provided on the associated output connector. The device may include distinct commands for each of the output connectors, so that each command can be allocated to the desired output connector. For example the command "PULSE-ONE" would generate a pulse on a first output connector, and "PULSE-TWO" would generate a pulse on a second output connector. Thus each command would include, in the command itself, an indication of which output connector is to carry the output signal.

Alternatively, the inventive device with multiple output connectors may include channel-selection commands that select one of the output connectors for voice control, and deselect all the other output connectors. Subsequent commands then cause the desired output signals to be generated only on the output connector specified in the most recent channel-selection command, without affecting the other outputs. Thus multiple simultaneous output signals can be arranged upon the output connectors by selecting each output connector in turn and setting up the desired output signals.

The invention enables a boundless range of valuable applications, particularly in the field of electronic development and testing. Electronics workers often need to activate a measurement instrument such as an oscilloscope, or modulate a circuit under test, using particular signals that the invention provides, all timed precisely at the user's pleasure. Another advantage of the invention is that it allows a user to safely control a system under hazardous conditions such as high voltage. Another advantage of the invention is that it allows a user to initiate responses in darkness using predetermined voice commands. Another advantage of the invention is that it allows multiple receiving systems to be activated simultaneously by the same command, or sequentially by multiple commands, simply by connecting the output connector or connectors to the receiving systems. The invention affords unprecedented operational flexibility and hands-free voice-activated convenience, enabling virtually effortless control over the type and timing of output signals for the first time.

DETAILED DESCRIPTION OF INVENTION

Figure 1:
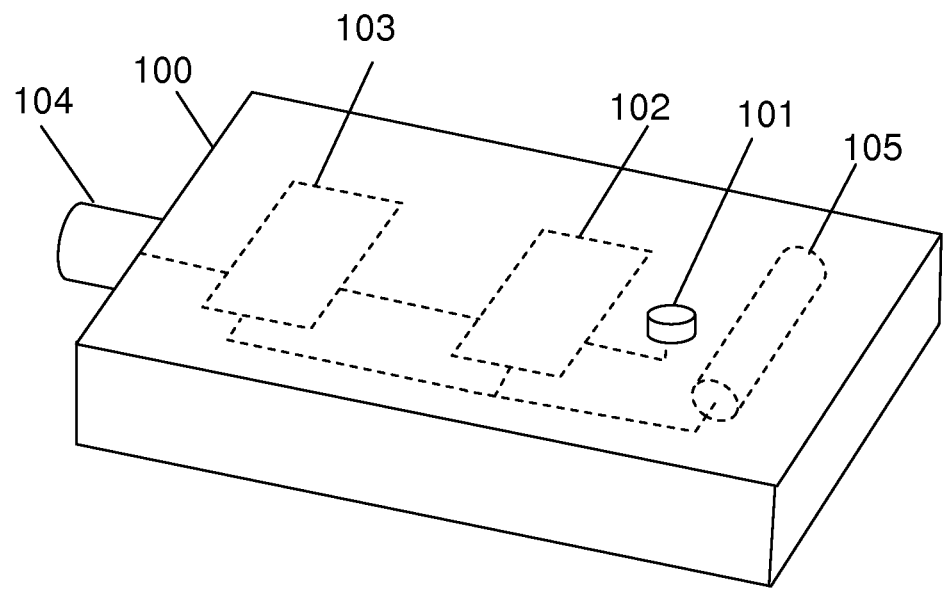
FIG. 1 is a sketch of a signal generator with a voice-activated output.

Referring to FIG. 1, a device according to the invention for generating output signals responsive to spoken commands comprises an enclosure 100, a microphone 101, an amplifier 102, a processor 103, an output connector 104, and a power source 105. Items interior to the enclosure 100 are shown dashed. Conductors comprising wires or circuit board traces are also shown connecting the microphone 101 to the amplifier 102, and the amplifier 102 to the processor 103, and the processor 103 to the output connector 104, and the power source 105 to the amplifier 102 and the processor 103.

The enclosure 100 is a plastic box to which the other components are secured. In the embodiment of FIG. 1, the microphone 101 and the output connector 104 are mounted on the exterior of the enclosure 100 and the amplifier 102 and the processor 103 are mounted inside the enclosure 100. The output connector 104 conveys the output signal to a receiving system (not shown) exterior to the device, and is detachable from the receiving system so that the invention can deliver output signals to any receiving system when connected thereto. In the embodiment of FIG. 1, the output connector 104 is a BNC connector.

The power source 105 is any means for providing DC voltage to the amplifier 102 and the processor 103. In the example of FIG. 1, the power source 105 comprises two type AA batteries wired in series to provide 3-volt DC power.

The microphone 101 converts sounds of a spoken command to electrical signals, having sufficient sensitivity and bandwidth to enable detection of the command sounds. The microphone 101 may be omnidirectional to receive command sounds from any direction, or it may be unidirectional so as to detect command sounds from a particular direction, preferably the direction where a user is positioned. In the embodiment of FIG. 1, the microphone 101 is an omnidirectional electret condenser microphone with a sensitivity of −44 dB, signal-to-noise ratio of 56 dB, and bandwidth spanning 100 Hz to 20 kHz. Some microphones require a biasing voltage. The microphone 101 is biased by a DC voltage from the amplifier 102.

The amplifier 102 amplifies and filters the electronic signals from the microphone 101, being configured with sufficient gain so that the amplified sound signals have sufficient amplitude to be detected by the processor 103. In the embodiment of FIG. 1, the amplifier 102 comprises two operational amplifier stages wired in series, each stage being configured with resistors and capacitors for a gain of 35 dB and a nominally flat passband of 300 Hz to 20 kHz.

The processor 103 is a microcontroller that includes an ADC. The ADC is configured to receive the amplified signal and repeatedly measure the amplified signal and generate a digitized signal. In the embodiment of FIG. 1, the processor 103 is a PIC16F690 microcontroller which is an 8-bit programmable controller with an internal 8 MHz clock, internal registers, and an internal ADC. The internal ADC is a 10-bit successive-approximation ADC capable of generating the digitized signal values with a 0.06 millisecond periodicity. (A near-infinite variety of other microcontrollers are also available which would perform equally well.)

The processor 103 is further programmed using firmware instructions to detect sounds of the spoken command and to compare the sounds to predetermined commands, thereby identifying the spoken command. In the embodiment of FIG. 1, the processor 103 is configured to detect voiced and unvoiced sounds, and to determine the detected order (the order of voiced and unvoiced sound intervals in the spoken command), and to compare that detected order to templates indicating the order of voiced and unvoiced intervals in the predetermined commands. More specifically, the processor 103 is configured to detect voiced sounds by averaging 16 successive digitized signal values, and then to compare the resulting average to a voiced-sound threshold. The processor 103 is further programmed to detect unvoiced sound intervals by subtracting successive digitized signal values from each other, thereby obtaining a differentiated signal which is strongly correlated with the rapid variations of unvoiced sound, and then to compare that differentiated signal to an unvoiced-sound threshold. By detecting time intervals containing voiced and unvoiced sounds, the processor 103 determines the order of voiced and unvoiced intervals in the spoken command, thereby determining the detected order. The processor 103 is further programmed to identify the spoken command by comparing the detected order to the templates which are stored in the microcontroller registers. When the detected order matches one of the templates, the processor 103 generates an output signal corresponding to the matching predetermined command, and passes the output signal to the output connector 104.

The processor 103 is programmed to produce an output signal comprising a pulse when the user says "PULSE". This command comprises an unvoiced-brief interval for P, then a voiced interval for UL, then an unvoiced interval for S. The E is silent.

Figure 2:
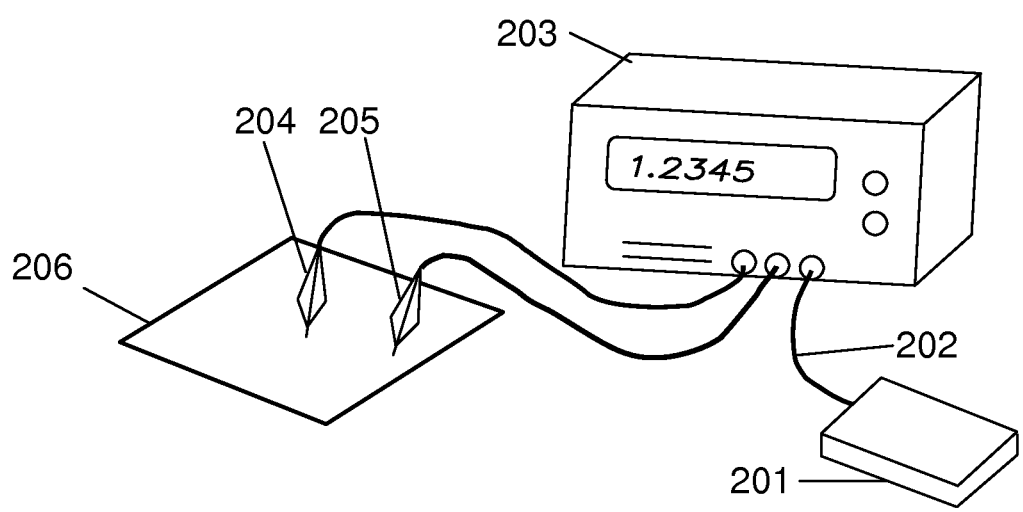
FIG. 2 is a sketch showing how the inventive system is connected for use.

FIG. 2 shows how the inventive device of FIG. 1 may be set up for use in an electronics testing application. The invention 201 is connected by a BNC cable 202 to a sample-and-hold voltmeter 203 so as to trigger the voltmeter 203. Two probes 204 and 205 are manually held at particular locations on a circuit under test 206. Upon a voice command, the invention 201 generates an output pulse that triggers the voltmeter 203 which immediately records and displays the voltage difference between the probes 204 and 205, thereby enabling an engineer to diagnose a problem in the circuit under test 206.

Alternatively, the invention 201 could be connected to the circuit under test 206 so as to activate the circuit under test 206, while the voltmeter 203 could be free-running or triggered by some other signal. Such a setup would allow the user to trigger a particular response from the circuit under test 206 at will, thereby enabling further diagnostic tests.

As another alternative, the invention 201 could trigger the voltmeter 203 and also activate the circuit under test 206 using the same output signal, or using subsequent output signals on the same output connector. In such a case the output connector would be connected to both of the two receiving systems, using multiple cables or a splitter for example.

The invention 201 is configured to generate different output signals responsive to different commands. For example the invention 201 could be configured to generate a single pulse upon the command "PULSE", or a double pulse for the command TWO PULSE". The invention 201 could begin a 1 kHz train of pulses upon the command "GO TRAIN", and stop pulsing upon "STOP TRAIN". The invention 201 could then increase or decrease the pulsing frequency upon commands "FASTER" and "SLOWER". Since each of these commands has a distinct order of voiced and unvoiced intervals, the invention 201 is able to identify them all, and to respond with a particular output signal as specified by the spoken command.

Figure 3:
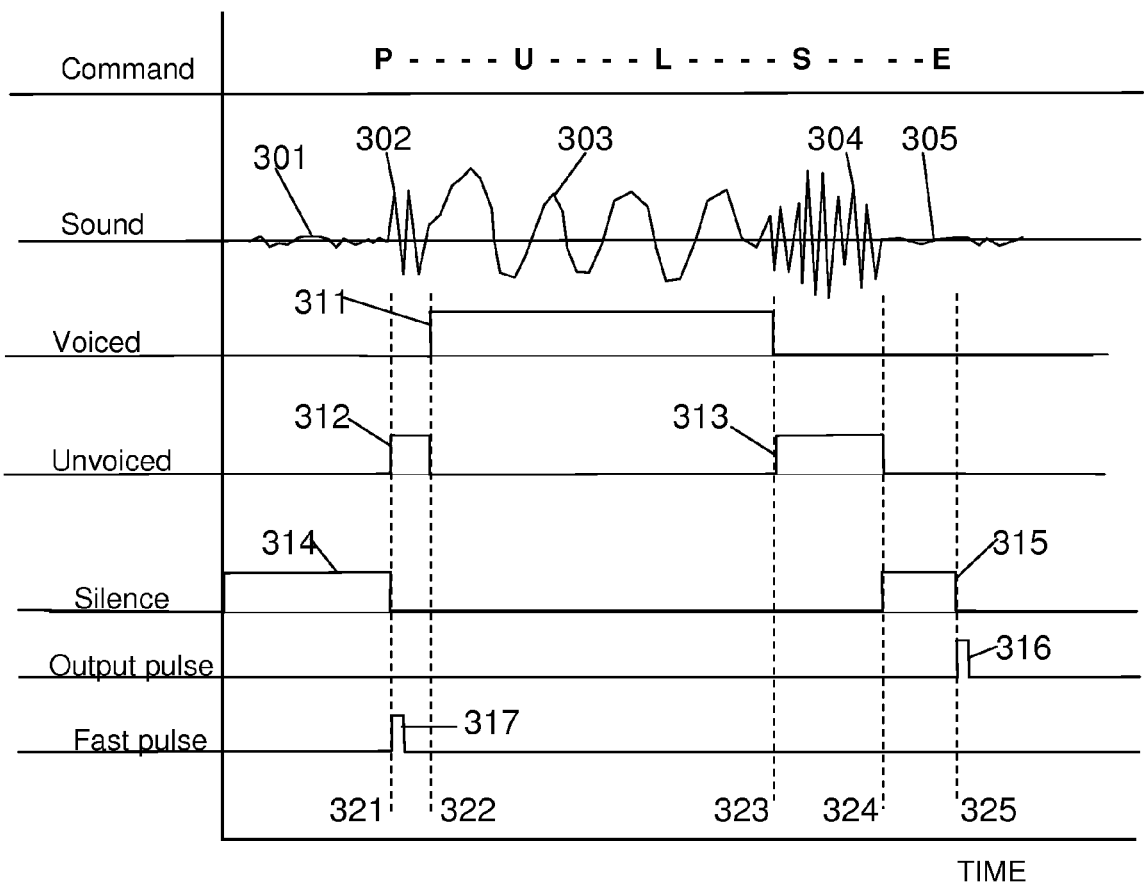
FIG. 3 is a chart showing various signals related to the example of FIG. 1.

FIG. 3 shows a set of graphs similar to oscilloscope traces, displaying various signals related to the example of FIG. 2. The command PULSE is shown at the top, with letters spread out so they line up with the traces. Certain times are indicated by vertical dashed lines.

The first trace, labeled Sound, shows the amplified sound signal 301 versus time. The sound signal 301 includes rapid voltage variations 302 corresponding to the unvoiced-brief sound of the P, then a region of slow variations 303 for the voiced UL portion of the command, and then a rapid variation region 304 for the unvoiced S. No voltage variations are detected during the region 305 because the E is silent.

The sound signal 301 shown in FIG. 3 is very highly simplified to illustrate the inventive principles. Also the time axis is compressed and not to scale. In a real system, the amplified signal of any spoken command would have hundreds or thousands of voltage variations with all shapes and sizes, exhibiting little or no reproducibility and a high degree of complexity. The inventive system exploits the signal complexity to identify each sound interval and recognize each spoken command.

The next trace, labeled Voiced, shows when the voiced interval 311 is detected. The sound signal 301 includes slow variations 303 occurring between times 322 and 323. Accordingly, the voiced interval 311 is shown detected between times 322 and 323, coincident with the slow variations 303.

The next trace, labeled Unvoiced, shows when the unvoiced intervals 312 and 313 are detected. The rapid variations 302, corresponding to the unvoiced sound of P, occurs between times 321 and 322. Accordingly, the unvoiced interval 312 is shown during the same time interval. The fast variations 304 corresponding to the S sound of the command are also detected between the times 324 and 325, resulting in the unvoiced interval 313.

Sound intervals may be detected by any means that discriminates voiced and unvoiced sound. Fast and slow variations correspond roughly to high and low frequencies, so that analog filters or digital FFT analysis could be used to identify the voiced and unvoiced sections. Much more preferably, the sound signal 301 is analyzed by a time-domain calculation that exploits the non-sinusoidal information in the sound signal 301 for rapid, deterministic identification of each sound interval. In the example of FIG. 3, slow variations are detected by averaging successive sound measurements that together span about 1 millisecond of data, which strongly emphasizes the voiced sounds and rejects unvoiced sounds. The voltage corresponding to silence is then subtracted from the average, the magnitude of the difference is derived, and the result is smoothed across 15 milliseconds. The smoothed integrated signal is then compared to a voiced-sound threshold value to detect voiced sound. The voiced interval 311 is that time interval wherein the smoothed integrated signal exceeds the voiced-sound threshold.

The unvoiced sounds 302 and 304 are analyzed by subtracting subsequent ADC measurements, which strongly emphasizes the fast variations of unvoiced speech, and then taking the magnitude of the difference and smoothing. The unvoiced intervals 312 and 313 indicate where the smoothed differentiated signal exceeds an unvoiced-sound threshold. The unvoiced interval 312 is rather short, thereby indicating that the P sound is an unvoiced-brief type. Brief and sustained intervals may be discriminated by comparing their duration to a limit Tbrief. In the example of FIG. 3, Tbrief is 30 milliseconds.

The next trace, labeled Silence, shows when silent times occur. In the example of FIG. 3, a silent interval is any time interval not containing a voiced or unvoiced interval. The sound signal 301 exhibits a pre-command silence that continues until time 321, comprising a silent interval 314. Also the sound signal 301 exhibits a post-command silence after time 324, shown as a silent interval 315. In the case of the "PULSE" command, the post-command silence also includes a silent period 305 that corresponds to the silent E but, since the E is terminal, the silent period 305 is indistinguishable from the rest of the post-command silence. By inspection, then, the detected order for this command is (unvoiced-brief)(voiced)(unvoiced).

Silent intervals may also occur interior to a command, such as the sound gap between the two words of the command "BACK TWO". In the example of FIG. 3, the pre-command silence 314 and the post-command silence 315 are discriminated from any internal silent intervals on the basis of duration. Internal silences are typically 40-100 milliseconds, or down to 10 milliseconds for a brief silence. Pre- and post-command silence times, on the other hand, are typically 200 milliseconds or longer.

The next trace, labeled Output pulse, shows when the output signal pulse 316 is generated. The output pulse 316 is generated as soon as the end of the command is detected. The end of the command is detected as soon as the duration of the silent interval 315 exceeds a certain limit Tfinal, which indicates that the command is finished. Preferably Tfinal is longer than any of the interior silent intervals, but not so long that the device seems balky. In the example of FIG. 3, the post-command silence time limit Tfinal is 250 milliseconds. A very short delay is also needed to carry out the template comparisons after the post-command silence, but with any decent processor that delay is entirely negligible on the graphs of FIG. 3. Optionally, the template comparisons and command identification may be carried out while the post-command silence is in progress, so that the correct output signal may be emitted as soon as the post-command silence requirement is reached and without any further delay.

When the invention generates the output signal after the post-command silence, there is a short but perceptible delay after the user has finished speaking the command. However, some applications require a very fast output signal with precision timing. Therefore the device may generate an immediate output circumventing all delays. Indeed, the immediate output would not even wait for the user to finish speaking the command. In a first embodiment of the invention with immediate output signals, the predetermined commands include an immediate command that begins with unvoiced sound, while all the other predetermined commands begin with voiced sound. If the user needs a fast precision output signal, the user could call the immediate command to obtain an instantaneous pulse coincident with the first sound of the command. If the user is content with an output signal arriving slightly later, usually just a few moments after the command is finished, then the user can call any of the regular commands to obtain one of the various non-immediate output signals in the usual way.

The example of FIG. 3 shows an immediate output signal comprising a fast pulse 317 occurring at time 321, coincident with the very first sound of the command, which is the unvoiced P sound. As soon as the device detects an unvoiced sound as the first sound of the command, the device generates the output pulse 317 immediately. After generating the pulse 317, the invention would not then generate a second pulse 316, because the later pulse 316 is the responsive output for a non-immediate command. Thus for each command the device produces a fast pulse or a normal pulse, but not both.

The immediate command is the only one of the predetermined commands in the example of FIG. 3 wherein the first interval is unvoiced, all the other predetermined commands beginning with a voiced sound. The various non-immediate commands may have unvoiced sounds occurring in the second interval or later in each command, but they will not generate the immediate pulse as long as the first sound is voiced. Only the first interval of the command is recognized as the immediate prompt.

Figure 4:
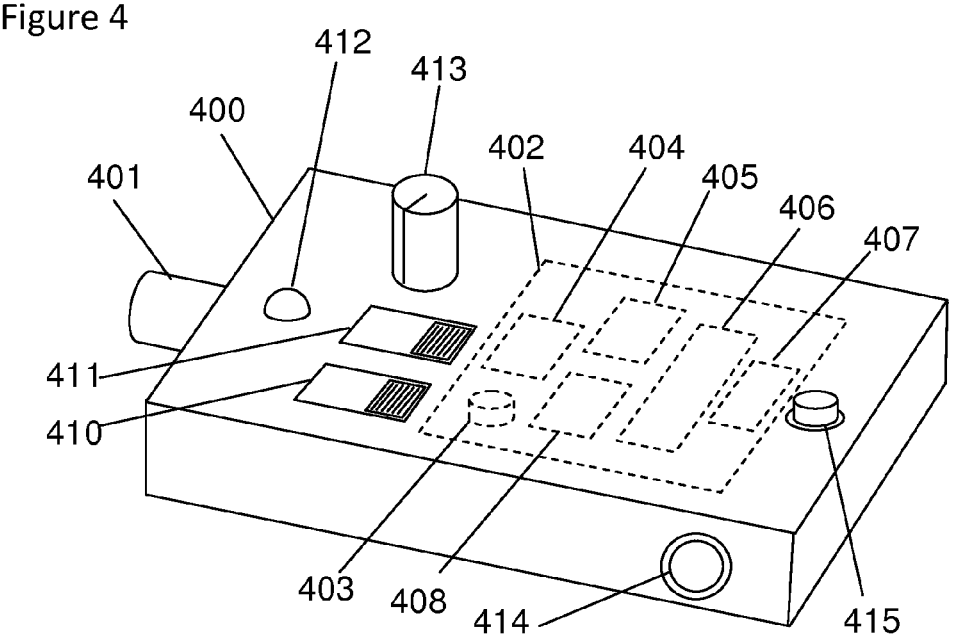
FIG. 4 is a sketch of a signal generator with multiple voice-activated modes.

FIG. 4 shows an embodiment of the invention wherein the output signal is a logic-level voltage comprising either ground or a particular positive voltage. The system comprises an enclosure 400 to which an output connector 401 is mounted, and which encloses a circuit board 402 on which are mounted a microphone 403, an amplifier 404, a digitizer 405, a processor 406, an output driver 407, and a memory 408.

Also mounted on the enclosure 400 are an indicator 412, a gain control 413, a power input jack 414 which is connected to an external power supply (not shown), a pushbutton 415, and two slide switches comprising an on-off switch 410 and a mode switch 411. Wires and/or circuit board traces (not shown) connect the on-off switch 410 to the power input jack 414 and the circuit board 402, and also connect the mode switch 411 and the indicator 412 and the gain control 413 and the pushbutton 415 to the circuit board 402, and connect the output driver 407 to the output connector 401.

The enclosure 400 is a metal box. The output connector 401 is an SMA connector. The circuit board 402 is a 4-layer printed circuit board including a ground plane. The microphone 403 is a piezoelectric microphone in a surface-mount package. The amplifier 404 is an MCP6292 dual opamp, which is AC-coupled to the microphone 403 and is configured with resistors and capacitors (not shown) for a total gain of 300 in the frequency band of voiced sounds at 300-3000 Hz, and for a total gain of 1000 in the frequency band of unvoiced sounds at 5000-15000 Hz.

The digitizer 405 is a DSP (digital signal processor) which is coupled to the processor 406 which is a microcontroller. The processor 406 controls the timing of the digitizer 405, and thus controls the digitization period. The digitizer 405 conveys the digitized signal to the processor 406 via a serial link or through eight parallel I/O pins wired between the two circuits. The processor 406 is programmed to identify spoken commands by comparing the detected order of voiced and unvoiced and silent intervals in the spoken command to the predetermined commands. The order of voiced and unvoiced and silent intervals in each predetermined command is stored as a template in the memory 408 which is a static RAM chip. The processor 406 is programmed to compare the spoken command with each of the templates representing the predetermined commands, and when they match, the processor 406 is configured to activate the output driver 407, comprising a low-impedance line driver or an emitter-follower, or other signal conditioner depending on the application. The output driver 407 then prepares the output signal for transmission, for example by amplifying or attenuating or reducing the impedance of the output signal, and then conveys the output signal to the output connector 401.

The mode switch 411 selects among a plurality of different output modes or signal types or operational functions of the device. In the embodiment of FIG. 4, the output signal is a DC voltage that can be set to ground or to a voltage Vsig in response to various commands, and the mode switch 411 selects the value of Vsig to be 1V, 3.3V, or 5V. The different output voltages are needed to accommodate receiving systems having different voltage limits.

The indicator 412 is an LED that illuminates whenever the device is ready to receive a command. The indicator 412 would be dark while the device is busy preparing its registers or waiting for a pre-command silence, or producing an output signal for example. The indicator 412 would be illuminated, green for example, when the device is ready to receive a command. The indicator 412 may also be flashed red whenever the output changes state, perhaps using a multi-wavelength LED package.

The gain control 413 is a potentiometer with a handy knob, configured to adjust the gain of the amplifier 404, thereby allowing a user to reduce the gain to reject a noisy background, or to compensate for someone who speaks softly by raising the gain.

To operate the device, the user must first call an enabling command which for the example of FIG. 4 is the command "GET-SET". After receiving the "GET-SET" command, the device will accept and respond to any of the output commands.

The output commands include "GET-MAX" which causes the output to be set to the maximum voltage value, and "GET-MIN" which causes the output to be set to ground. "GO" causes the output to alternate between Vsig and ground, each time it is called. The "STOP" command causes the output to return to ground, and disables any further commands other than "GET-SET". The commands allow the user to apply a logic-0 or a logic-1 to a circuit under test, using voice commands alone, thereby providing a rapid hands-free control over a circuit under test and hence a rapid detection of many problems.

The pushbutton 415 is configured to act similarly to the "GO" command, by alternating the output signal between Vsig and ground when pressed. Unlike the "GO" command, the pushbutton 415 performs the alternation function at any time, even when the output commands are not enabled. Being able to alternate the output silently is useful in some applications.

Figure 5:
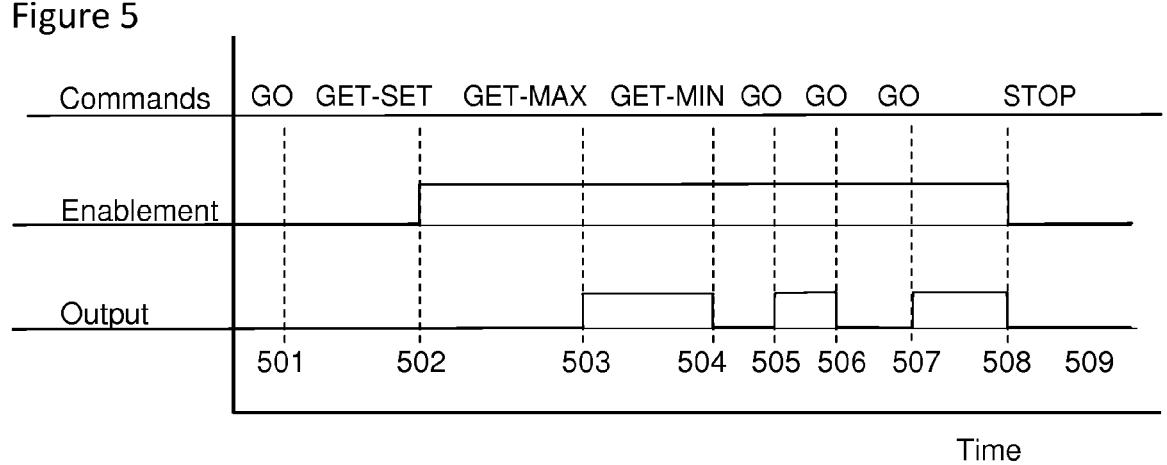
FIG. 5 is a chart showing various signals related to the example of FIG. 4.

FIG. 5 shows signals related to the example of FIG. 4. A series of spoken commands is shown at the top, and vertical dashed lines show time events. The trace labeled Output shows the state of the output signal, low being ground and high being Vsig. The trace labeled Enablement shows the state of an enablement parameter, wherein low indicates disabled and high indicates enabled. When the enablement parameter is set enabled, the device generates an output signal responsive to each output command. When the enablement parameter is set to disabled, the device inhibits all output signals regardless of any output commands.

Initially, the enablement parameter is in the disabled state. A "GO" command is received at time 501 but has no effect because the command occurs while the enablement parameter is still set disabled. Then at time 502 the enabling command "GET-SET" is received, causing the enablement parameter to become enabled. Then at time 503 the command "GET-MAX" causes the output signal to go high (to Vsig), and at time 504 the command "GET-MIN" causes the output signal to return low (to ground). Then a series of "GO" commands causes the output signal to alternately go high and low at times 505, 506, and 507. At time 508, a "STOP" command causes the enablement parameter to be set disabling and the output signal to return to ground. The example demonstrates that the user can control the output signal, setting to a logic high or low state, or alternating the output sequentially, using voice commands.

The example of FIG. 5 also illustrates an immediate response to the "STOP" command, which is the only command in the example that begins with an unvoiced sound. All the other commands begin with a voiced sound. The device is configured to set the output signal to ground immediately when the first sound of a command is unvoiced. Accordingly, in FIG. 5 the output signal returns to ground at time 508 which is at the very beginning of the "STOP" command. All the other commands produce output signals only after each command is finished, as shown by the various dashed lines occurring at the end of each command.

The indicator 412 may be configured to show the state of the enablement parameter so the user knows whether the output commands are enabled or not. This is a valuable option because users find it frustrating to issue a command without knowing whether the device is receptive. Thus the indicator 412 may be illuminated green between times 502 and 508, since this is the time that the enablement parameter is set enabled. The indicator 412 could flash red briefly whenever the output signal changes state, thereby informing the user that a change has occurred. Or, the indicator could be illuminated in red when the output signal is high, thereby informing the user of the output state. As a further alternative, the indicator 412 could be a multi-wavelength LED assembly so that both red and green are illuminated simultaneously when the enablement and output signal are both positive. Or, if that's confusing, perhaps it would be better to use two separate indicators.

Figure 6:
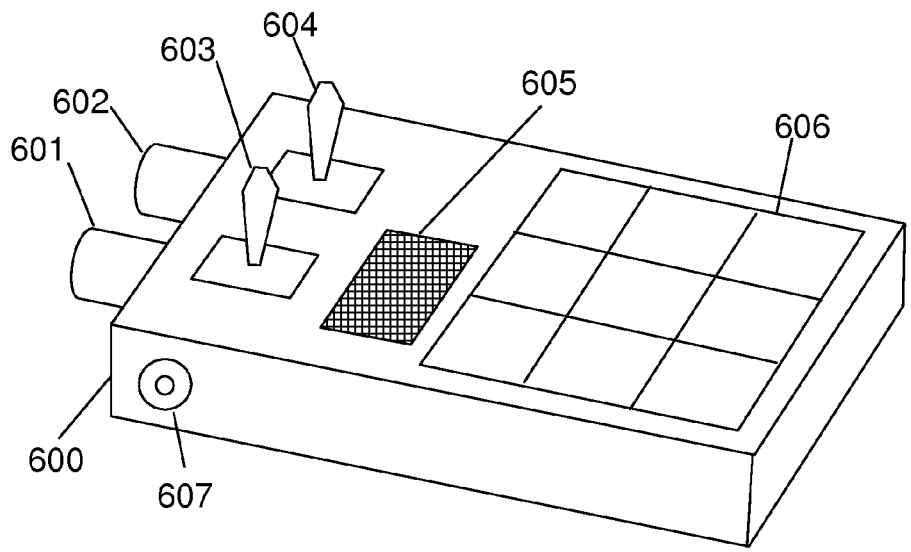
FIG. 6 is a sketch shown the invention with two output connectors.

FIG. 6 shows an embodiment of the invention providing two output signals in parallel. Mounted on a case 600 are two output connectors 601 and 602, and two mode switches 603 and 604, an acoustical cover 605, a photocell array 606, and a 3.5 mm audio phone jack 607. Using voice commands, the user can specify which of the output connectors 601 and 602 will carry the next requested output signal. Output commands thereafter will generate the requested output signal upon the specified output connector.

The mode switches 603 and 604 are 3-position toggle switches that select what type of output signal is generated. Mode switch 603 governs the output type for connector 601, and mode switch 604 governs the output type for connector 602. When each mode switch 603 or 604 is in a first position, the output signal comprises a short pulse or a pulse train depending on the command. In a second position, square-wave signals can be generated, the frequency being determined by the commands. In a third position, logic-level voltages can be generated upon voice commands. Since the two mode switches 603 and 604 are set independently, two different types of output signals can be generated on the two output connectors 601 and 602 at the same time.

The acoustical cover 605 is a sound-permeable panel such as a screen or cloth that protects an electronic assembly (not shown) inside the case 600. The electronic assembly includes a microphone, amplifier, and processor as described in FIG. 1 or 4.

The photocell array 606 is a set of photovoltaic cells that generate power to run the device, drawing energy from ambient room light for example. Optionally, and preferably, a rechargeable battery (not shown) is included so that energy can be stored while the device is not in use, and to provide power when in dim light.

The audio jack 607 is configured to receive an electrical signal from an external microphone or a headset with a boom microphone (not shown). The audio jack 607 may also be configured to transmit signals outward to an external speaker such as a headset speaker, thereby alerting the user that a command has been received for example. An advantage of using an external microphone or a headset is that the microphone is placed much closer to the user, thereby providing louder and clearer command sounds for better command interpretation. The embodiment includes an automatic amplifier gain control which automatically adjusts the sensitivity while keeping the peak signal below a predetermined maximum limit, and particularly to keep from saturating the amplifier. The device decreases the gain immediately if the amplified signal ever exceeds the predetermined maximum limit. However if the amplified signal remains below a predetermined minimum limit for a long time, typically several seconds, the device gradually increases the gain. In the example of FIG. 6, the maximum limit is 8 volts which is just below the amplifier saturation voltage, and the minimum limit is 0.08 volts thereby providing a 40 dB working range while automatically compensating for different noise environments. The automatic gain control also compensates for users who speak louder or more quietly, and also for the increased amplitude obtained from a headset microphone.

Figure 7:
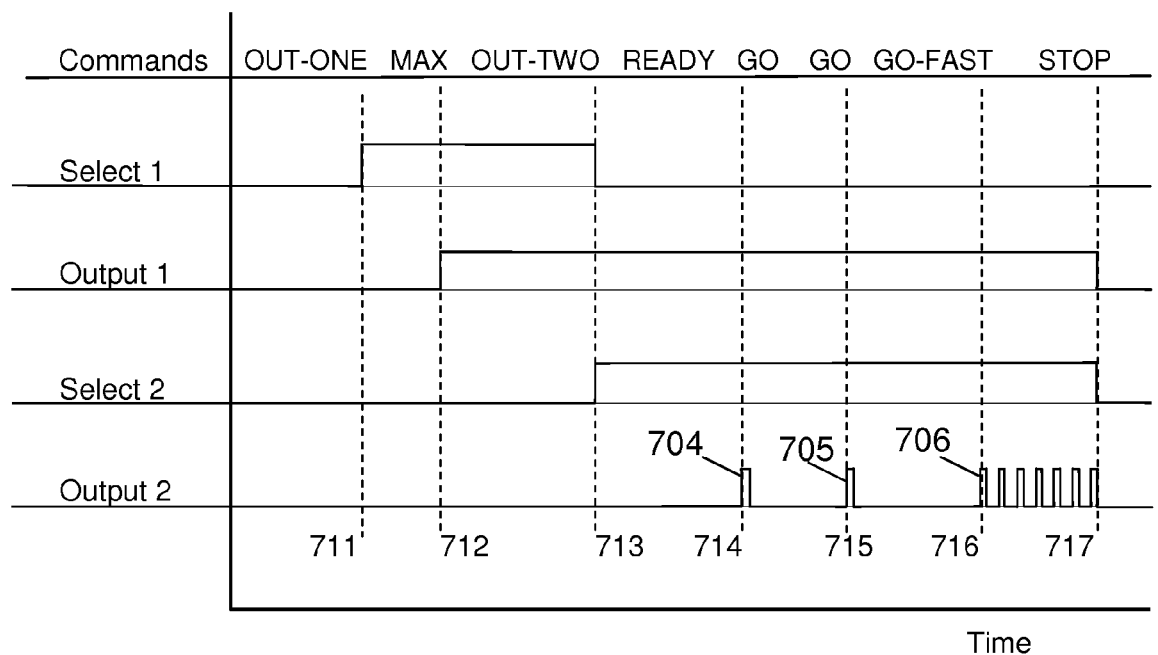
FIG. 7 is a chart showing how voice commands control two outputs.

FIG. 7 shows signals related to the embodiment of FIG. 6, particularly showing how two simultaneous output signals are controlled by voice commands. The example of FIG. 7 involves two channel-select commands, one arming command, and various output commands. The channel-select commands are "OUT-ONE" and "OUT-TWO", specifying which of the output connectors 601 or 602 are to be controlled by the subsequent output commands. For example, if the user calls "OUT-TWO", then the subsequent output commands such as "GO" will cause the output signals to be generated on output connector 602, while the deselected channel, in this case output connector 601, simply continues whatever output signals it was already carrying. Thus, deselection of any output connector leaves the ongoing output signal of that output connector unchanged. The "STOP" command deselects both channels and stops both output signals. All of these functions, and many other variations, can be programmed using many microcontrollers.

The arming command is "READY" which generates no output signal, but arms or prepares the device to generate an immediate output pulse upon the next sound. The user arms the device by calling "READY", and then, at the exact moment that a pulse is desired, the user says "GO" or any other sound. The device then generates the output signal instantly. After a single immediate pulse, the arming condition is terminated to avoid producing fast pulses when not desired. Any additional "GO" commands beyond the first one would not generate an immediate pulse, but would generate a regular non-immediate output pulse, which is generated after each command has finished and been processed. However, if the user needs a second immediate pulse, the user may again set the arming condition by again calling "READY". The user can obtain regular non-immediate output signals by calling the regular output command, or can obtain an instantaneous output pulse by first calling the arming command and then calling an output command. As a further option, the user can obtain a rapid sequence of immediate pulses by repeatedly calling the arming command, as in "READY . . . READY . . . READY". The device generates a fast pulse upon the first sound of each command, while the rest of the command re-arms the device for the next sound.

As mentioned with reference to FIG. 6, the mode switches 603 and 604 govern the type of output signal on each of the output connectors 601 and 602 respectively. More specifically, the mode switch 603 is set for logic-level output voltages on output connector 601, and mode switch 604 is set for pulse output signals on the output connector 602. All the output signals are initially off, and both channels are initially deselected. If any output commands are received while both channels are deselected, the command will be ignored. Only one channel can be selected at a time. When one channel is selected by a channel-select command, the other channel is automatically deselected.

The top of FIG. 7 shows a series of commands. "OUT-ONE" selects the output connector 601 for voice commands. The trace labeled Select 1 shows when the first connector is selected. Accordingly, Select 1 goes high as soon as the "OUT-ONE" command is finished at time 711, thus indicating that subsequent output commands will apply to connector 601.

Then, at time 712, the command "MAX" is recognized. Since connector 601 is still selected, the command applies to the output connector 601. Recalling that the mode switch 603 is set for logic-level outputs, the output signal on connector 601 (shown in FIG. 7 as the trace Output 1) then goes high, responsive to the "MAX" command at time 712.

At time 713, the other channel-select command "OUT-TWO" is recognized. This causes output connector 601 to be deselected and connector 602 to be selected as shown in the trace labeled Select 2. The logic-high signal on the output connector 601 continues unchanged, as can be seen in the trace Output 1.

Then, the arming command "READY" is received. This command causes no output signals, but sets the arming condition so that the device will produce an instantaneous output upon the next sound.

At time 714, the first sound of "GO" is detected, and since the arming condition is set, the first sound causes the device to generate an instantaneous output at time 714. The arming condition is also unset at that time. The connector 602 is still selected, and the mode switch 604 is set for pulse outputs, so a single short pulse 704 is transmitted from connector 602. The pulse 704 is generated at the start of the command, as shown by the dashed line for time 714, rather than at the end of the command, since the immediate output was called for, consequent to the "READY" command.

At time 715, a second "GO" is recognized, generating a second pulse 705 on the Output 2. However, the arming condition was terminated as soon as the first output 704 was produced, and so the subsequent commands are recognized as regular non-immediate commands. Accordingly, the second pulse 705 is generated after the corresponding command has finished, as shown by the dashed line at time 715 being at the end of the second GO command. FIG. 7 demonstrates that the user can obtain a non-instantaneous pulse using the regular command, or an instantaneous pulse with precision timing by first calling the arming command.

At time 715, the command "GO-FAST" is received, which causes an output signal comprising a train of pulses 706 to be generated and passed to the output connector 602. The pulses continue until the "STOP" command is received at time 716, whereupon both outputs return to ground and both channels are deselected.

The example of FIG. 7 shows how the invention may be used to generate two different signals on two connectors simultaneously using voice commands. This ability would be extremely useful in certain situations such as electronic testing, when a user wishes to apply a trigger pulse to a circuit while alternating a state of the circuit under test. The invention provides a logic high or low signal on connector 601 while delivering trigger pulses via connector 602, all under voice control. Users can set the mode switches 603 and 604 to provide the type of signals needed for a testing application, and connect the output connectors 601 and 602 to activate or modulate the circuit under test, and trigger a measurement instrument, with all output timing and signal types being directed by voice commands alone. And, as discussed, the user can obtain an immediate pulse with precision leading-edge timing by first calling the arming command.

The example of FIG. 7 employs the same set of output commands ("GO" and so forth) to control the two output connectors, and the channel-select commands determine which connector is to be controlled at any time. The channel-select commands allow the user to set up output signals in the output connectors sequentially. In some applications, however, it may be more convenient to use two different command sets for generating output signals on the two output connectors 601 and 602, rather than the channel-select commands. In that case the user could call channel-specific commands, such as "ONE-MAX" or "ONE-MIN" or "ONE-GO" to control the output signals on connector 601, and "TWO-MAX" or "TWO-MIN" or "TWO-GO" to control the output signals on connector 602 at any time. The inventive device can be programmed for either the channel-specific or channel-select command set. The device could also include a switch or a particular voice command, to allow the user to select which command set is active. Since each of these commands has a distinct order of voiced and unvoiced and silent intervals, the invention reliably recognizes all these commands.

Figure 8:
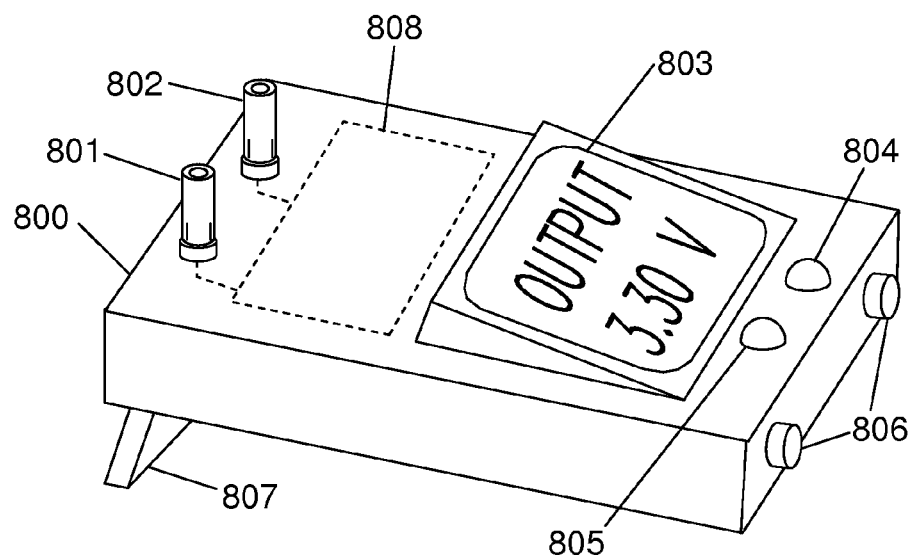
FIG. 8 is a sketch showing an embodiment with an LCD display.

FIG. 8 shows an embodiment of the invention adapted to control hazardous equipment, such as a high voltage system, from a safe distance by voice commands. The inventive device comprises an enclosure 800, an output connector 801 comprising a binder-post connector of the type that receives a banana plug or a spade connector or a stripped wire with manual tightening. A second connector 802 is connected to the device ground. An LED or LCD display 803, tilted at an angle for easy viewing, shows messages such as the voltage value of the output signal. A pair of LED indicators 804 and 805 indicate the state of the output signal. Two microphones 806 are mounted on the front wall of the enclosure, positioned to improve the detection of sound coming from a user who may be some distance away, and are wired in parallel for doubled sensitivity. A foldable prop 807 allows the device to sit at a convenient angle. Interior to the enclosure 800 is a microcontroller 808 that includes an amplifier, an ADC, a digital processor programmed to identify command sounds and generate output signals responsively, a DAC (digital-to-analog converter), memory elements, and a display driver. The power source, not shown, is a pair of 9-volt batteries connected in series with the common point being the device ground, thereby providing the positive and negative voltages needed for bipolar analog electronics.

The device of FIG. 8 is intended to generate analog voltages responsive to voice commands, thereby enabling the control of a dangerous high voltage system (not shown) from a safe distance. The microcontroller 808 generates an analog output from the built-in DAC, the output voltage being varied according to voice commands, and delivers the analog output to the output connector 801. The high voltage system is, for example, a DC-DC 1000:1 amplifier generating 5000 volts responsive to a 5 volt input, or −5000 volts for a −5 volt input. The invention is used to safely operate the high voltage system by generating the desired control voltage under voice commands. The user need not touch or even go near the inventive device while the high voltage is on.

The voice commands recognized by the device of FIG. 8 are "SET-MAX" to generate the maximum positive voltage, "SET-MIN" for the most negative voltage, and "ZERO" to return the output signal to ground. The commands "GO-UP" and "GO-DOWN" cause the output voltage to be ramped up or down at a moderate rate, perhaps 1 volt per second. The commands "UP-FAST" and "DOWN-FAST" cause the output voltage to be ramped up or down at a faster rate, continuing until the voltage reaches the maximum or minimum value.

The LED indicators 804 and 805 show the polarity and activity of the output signal. The indicator 804 shows red when the output signal goes positive, and indicator 805 shows green when the output signal goes negative, all voltages being relative to the device ground. When the output is zero volts, both indicators 804 and 805 are off. Also the LCD display 803 shows messages such as the value of the output voltage.

Figure 9:
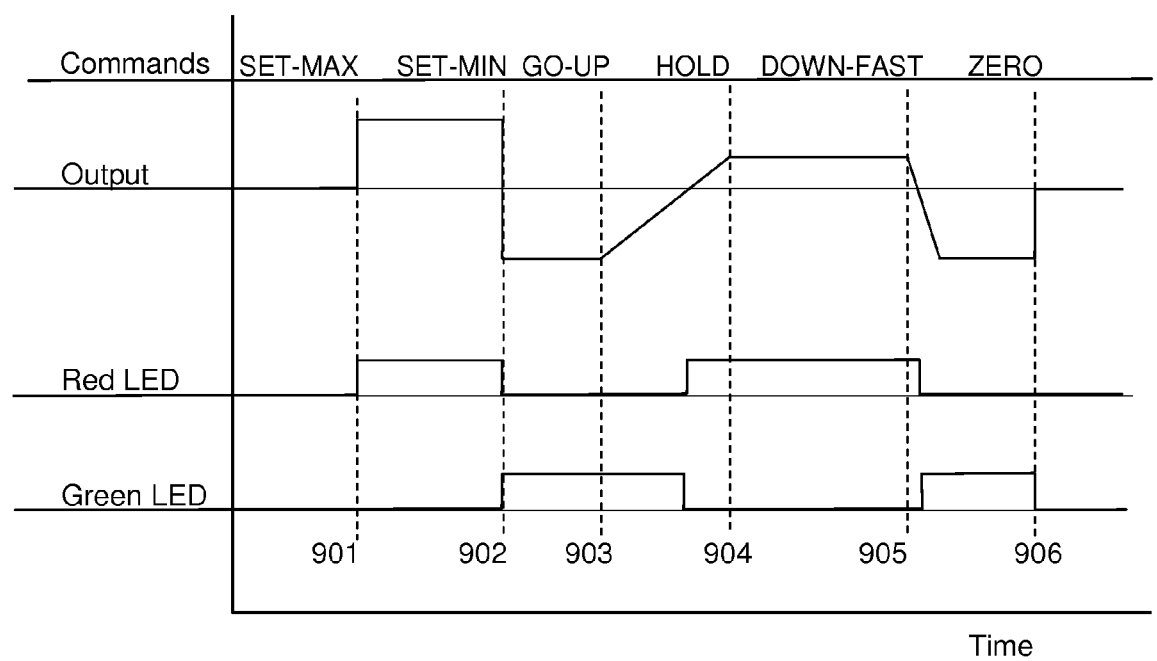
FIG. 9 is a chart showing an analog output signal.

FIG. 9 is a chart showing the output voltage and LED status of the device of FIG. 8, for various commands. The commands are shown across the top. The trace labeled Output shows the output voltage. The trace labeled Red LED shows the activity of indicator 804, and Green LED shows the activity of indicator 805. Initially, the output signal is zero volts and both indicators 804 and 805 are off. At time 901, the command "SET-MAX" is received, which causes the device to increase the output voltage to the maximum value. The Red LED trace is activated between times 901 and 902 when the output is positive.

At time 902, the command "SET-MIN" is received, causing the output voltage to drop to the minimum value. The Red LED turns off and the Green LED turns on indicating that the output is negative.

At time 903, the command "GO-UP" is received, which causes the processor to gradually ramp up the DAC voltage in a linear fashion, as shown in the Output trace. As the output passes from negative to positive voltage, the Red LED turns off and the Green LED turns on.

At time 904 the command "HOLD" is received, which stops the ramping. The output voltage remains constant thereafter until time 905, when the command "DOWN-FAST" is received. The processor responsively ramps the DAC output down rapidly until the output voltage reaches the minimum value, and then the output remains at that voltage. Also, the LED's again invert when the output voltage passes from positive to negative.

At time 906, the command "ZERO" is received, whereupon the processor causes the DAC to generate a zero volt output, and both LED's accordingly turn off. Since all these commands have a distinct order of voiced and unvoiced intervals, the inventive device recognizes them all.

Although the example of FIGS. 8 and 9 is highly idealized, workers with skill in electronics will appreciate how the inventive device enables precise control over a potentially hazardous system, with actions and timing being controlled hands-free and from a safe distance by voice commands alone.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

The invention claimed is:

1. A device for triggering a measurement instrument, responsive to a spoken command comprising voiced and unvoiced sound intervals in a particular order, said device comprising a microphone, an amplifier, a processor, memory elements, and an output connector, wherein:

the memory elements contain information indicating the order of voiced and unvoiced sound intervals in a plurality of predetermined commands;

the microphone is configured to convert sounds of the spoken command to an electrical signal;

the amplifier is configured to amplify the electrical signal, thereby generating an amplified signal;

the processor is configured to analyze the amplified signal, thereby detecting and identifying speech sounds as being voiced sounds and unvoiced sounds in the spoken command, thereby determining the order of voiced and unvoiced intervals in the spoken command;

the processor is further configured to generate a particular output signal when the order of voiced and unvoiced intervals in the spoken command matches the order of voiced and unvoiced intervals in one of the predetermined commands, the particular output signal being associated with the matching predetermined command, the output signal comprising an electrical pulse having an amplitude and a duration sufficient to trigger the measurement instrument and cause the measurement instrument to make a measurement; and the output connector is configured to detachably connect to the measurement instrument, and to convey the output signal to the measurement instrument so as to trigger the measurement instrument, thereby causing the measurement instrument to make a measurement;

wherein the measurement instrument comprises an oscilloscope or a sample-and-hold voltmeter.

2. A device for triggering a measurement instrument, responsive to a spoken command comprising voiced and unvoiced and silent intervals in a particular order, said device comprising an enclosure, a microphone, an amplifier, a digitizer, a processor, memory elements, an output connector, and a power source wherein:

the memory elements contain a plurality of templates, each template indicating the order of voiced and unvoiced and silent intervals in a predetermined command, and each template being associated with a particular output signal;

the microphone, amplifier, digitizer, processor, memory elements, output connector, and power source are mounted on or within the enclosure;

the power source is configured to provide electrical power to the amplifier, the digitizer, and the processor;

the microphone is configured to convert sounds of the spoken command to an electrical signal;

the amplifier is configured to amplify the electrical signal within a predetermined passband thereby generating an amplified signal;

the digitizer is configured to measure the amplified signal repeatedly and periodically, thereby generating a digitized signal comprising measurement values representing the sounds of the spoken command;

the processor is configured to analyze the digitized signal, thereby detecting each voiced sound and unvoiced sound of the spoken command, and to identify which sounds are voiced and which sounds are unvoiced, and to determine the order of voiced and unvoiced and silent intervals in the spoken command;

the processor is further configured to compare the order of voiced and unvoiced and silent intervals in the spoken command to each of the templates, and to generate the particular output signal associated with any template that matches the order of voiced and unvoiced and silent intervals in the spoken command, the output signal comprising an electrical pulse having an amplitude and a duration sufficient to trigger the measurement instrument and cause the measurement instrument to make a measurement; and the output connector is configured to detachably connect to the measurement instrument, and to convey the output signal to the measurement instrument so as to trigger the measurement instrument, thereby causing the measurement instrument to make a measurement;

wherein the measurement instrument comprises an oscilloscope or a sample-and-hold voltmeter.

3. The device of claim 2 which further includes a switch to select an output mode, and an output mode wherein the output signal comprises a series of electrical pulses, each pulse having an amplitude and a duration sufficient to trigger the measurement instrument and cause the measurement instrument to make a measurement, the series of pulses being started responsive to a first command and being stopped responsive to a second command without changing the output mode.

4. The device of claim 2 which further includes multiple indicators configured to produce multiple distinct visible light signals, each visible light signal separately indicating:

when the device is powered on;

when the power source is inadequate;

and when the device is able to receive a command;

and when the device is producing an output signal;

and when a spoken command matches one of the templates;

and when a spoken command matches none of the templates.

5. The device of claim 2 which further includes an enablement parameter that can be set to an enabled state and a disabled state, and wherein the predetermined commands include an enabling command and at least one output command, wherein:

the device is configured to set the enablement parameter alternately to enabled and disabled, responsive to the enabling command;

the device is further configured to generate a particular output signal, responsive to the output command, when the enablement parameter is set enabled;

and the device is further configured to inhibit all output signals when the enablement parameter is set disabled;

and the device is further configured to inhibit all commands, other than the enabling command, when the enablement parameter is set disabled.

6. The device of claim 2 which further includes an enablement parameter that can be set to an enabled state and a disabled state, and an alert signal that indicates that an error has occurred, and wherein the predetermined commands include an enabling command, a disabling command, and at least one output command, wherein:

the device is configured to set the enablement parameter to enabled, responsive to the enabling command, and to set the enablement parameter to disabled, responsive to the disabling command;

the device is further configured to generate, responsive to the output command, a first output signal when the enablement parameter is set enabled, and a second output signal when the enablement parameter is set disabled;

and the device is further configured to generate the alert signal responsive to the output command when the enablement parameter is set disabled.

7. The device of claim 2 which further includes an enablement parameter that can be set to an enabled state and a disabled state, and a timer that indicates when a predetermined time interval has expired, and an alert signal indicating that an error has occurred, and wherein the predetermined commands include an enabling command and at least one output command, wherein:

the device is configured to set the enablement parameter to enabled and to start the timer, responsive to the enabling command;

the device is further configured to generate a particular output signal, responsive to the output command, when the enablement parameter is set enabled;

the device is further configured to inhibit all output signals while the enablement parameter is set disabled;

and the device is further configured to set the enablement parameter to disabled when the predetermined time interval expires;

and the device is further configured to generate the alert signal responsive to the output command when the enablement parameter is set disabled.

8. The device of claim 2 wherein the predetermined commands include an immediate command that begins with a particular type of sound, and the device is configured to generate an output signal immediately upon detecting the particular type of sound as the first sound of a spoken command, the particular type of sound being either a voiced sound or an unvoiced sound.

9. The device of claim 2 wherein the predetermined commands include an arming command, and wherein the device is configured to generate the output signal immediately upon detecting a sound after detecting the arming command.

10. The device of claim 2 wherein:

the processor is further configured to detect voiced sound by adding or averaging successive values of the digitized signal, thereby deriving a sum or average respectively, and then comparing the sum or average to a voiced-sound threshold;

and the processor is further configured to detect unvoiced sound by subtracting successive values of the digitized signal from each other, thereby deriving a difference, and then comparing the difference to an unvoiced-sound threshold.

11. The device of claim 2 which further includes multiple output connectors, each output connector comprising means for detachably connecting to a different measurement instrument and for conveying a different output signal to each measurement instrument, and which further includes multiple channel-selection commands and an output command, wherein:

each channel-selection command is associated with one of the output connectors;

responsive to each channel-selection command, the associated output connector is selected and remains selected until a different channel-select command is received;

and the device is configured to generate the output signal responsive to the output command, and to convey the output signal to the selected output connector.

12. A method for causing a device to cause a measurement instrument to make a measurement, responsive to a spoken command, said method comprising the steps:

converting sound of the spoken command to a sound signal comprising sequential digital values representing the sound;

analyzing the sound signal to detect voiced sounds;

analyzing the sound signal to detect unvoiced sounds;

determining the order of voiced and unvoiced sounds in the spoken command;

comparing the order of voiced and unvoiced sounds in the spoken command to templates containing the order of voiced and unvoiced sounds in predetermined commands via a processor;

when the order of voiced and unvoiced sounds in the spoken command matches the order of voiced and unvoiced sounds in one of the templates, generating an output signal associated with the matched template, the output signal comprising an electrical pulse having an amplitude and a duration sufficient to trigger the measurement instrument and cause the measurement instrument to make a measurement; and conveying, via an output connector configured to detachably connect the device to the measurement instrument, the output signal to the measurement instrument, thereby causing the measurement instrument to make the measurement;

wherein the measurement instrument comprises an oscilloscope or a sample-and-hold voltmeter.

13. The method of claim 12 which further includes the steps:

analyzing the sound signal to detect silent intervals in the spoken command, each silent interval being preceded and followed by intervals containing voiced or unvoiced sound;

determining the order of voiced and unvoiced sounds and silent intervals in the command;

and, when the order of voiced and unvoiced sounds and silent intervals in the command matches the order of voiced and unvoiced sounds and silent intervals in one of the templates, generating the output signal associated with the matched template.

14. The method of claim 12 which further includes the steps:

adding or averaging multiple values of the sound signal, thereby producing a sum or average;

comparing the sum or average to a voiced-sound threshold, a voiced sound being detected and identified as voiced sound when the sum or average exceeds the voiced-sound threshold;

subtracting values of the sound signal from each other, thereby producing a difference;

and comparing the difference to an unvoiced-sound threshold, an unvoiced sound being detected and identified as unvoiced sound when the difference exceeds the unvoiced-sound threshold.

15. The method of claim 12 which further includes the steps:

adding or averaging sequential values of the sound signal spanning an integration time in the range of 0.5 to 2 milliseconds, thereby producing a sum or average;

rectifying the sum or average, thereby producing an integration magnitude;

comparing the integration magnitude to a voiced-sound threshold, a voiced sound being detected and identified as voiced sound when the integration magnitude exceeds the voiced-sound threshold;

subtracting values of the sound signal from each other, the values being separated by a time in the range of 0.05 to 0.1 milliseconds, thereby producing a difference;

rectifying the difference, thereby producing a differential magnitude;

and comparing the differential magnitude to an unvoiced-sound threshold, an unvoiced sound being detected and identified as unvoiced sound when the differential magnitude exceeds the unvoiced-sound threshold.

16. The method of claim 12 which further includes an immediate command, and the steps:

detecting sound at the beginning of the immediate command;

and then immediately generating the output signal;

thereby causing the measurement to be made at the beginning of the immediate command.

17. The method of claim 12 which further includes an immediate command that begins with a particular sound type, the particular sound type being in the set of voiced sound and unvoiced sound, said method further including the steps:

detecting a leading sound comprising the sound at the beginning of a spoken command;

analyzing the leading sound to determine if the leading sound is of the particular sound type;

and, if the leading sound is of the particular sound type, immediately generating the output signal;

thereby causing the measurement to be made at the beginning of the immediate command.

18. The method of claim 12 which further includes an arming command and the steps:

receiving and recognizing the arming command;

then, detecting any sound;

then, immediately generating the output signal.

19. The method of claim 12 which further includes an output command and multiple output connectors and multiple channel-selection commands, each channel-selection command being associated with one of the output connectors, said method further including the steps:

receiving a first channel-selection command, and responsively selecting a first output connector which is associated with the first channel-selection command;

then, responsive to each subsequent output command, generating the output signal on the first output connector;

then, responsive to a second channel-selection command different from the first channel-selection command, selecting a second output connector which is associated with the second channel-selection command;

then, responsive to each subsequent output command, generating the output signal on the second output connector;

and continuing to generate the output signal on the second output connector, responsive to each successive output command, until a third channel-selection command, different from the second channel-selection command, is received.

\* \* \* \* \*